(12) United States Patent
Wang et al.

(10) Patent No.: US 8,160,565 B2
(45) Date of Patent: Apr. 17, 2012

(54) DEVICE WITH MULTIDIRECTIONAL CONTROL FOR SELECTING ACTIONS TO PERFORM ON A TELECOMMUNICATION DEVICE

(75) Inventors: Winston Wang, Seattle, WA (US);
Jason W. Valalik, Shoreline, WA (US);
Jonathan L. Mann, Seattle, WA (US);
Richard Alan Ewing, Jr., Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 147 days.

(21) Appl. No.: 12/788,236

(22) Filed: May 26, 2010

(65) Prior Publication Data
US 2011/0294489 A1   Dec. 1, 2011

(51) Int. Cl.
*H04W 4/00* (2009.01)
(52) U.S. Cl. ......... 455/419; 455/66.1; 700/61; 327/100; 715/764
(58) Field of Classification Search .................. 455/419, 455/66.1; 700/61; 327/100
See application file for complete search history.

(56) References Cited

U.S. PATENT DOCUMENTS

| 6,791,467 | B1 | 9/2004 | Ben-Ze'ev |
| 2007/0247800 | A1* | 10/2007 | Smith et al. .................. 361/683 |
| 2008/0017493 | A1 | 1/2008 | Richardson et al. |
| 2008/0288092 | A1* | 11/2008 | Matthews et al. ............... 700/61 |

FOREIGN PATENT DOCUMENTS

KR 200170113 2/2000
KR 20100033716 3/2010

OTHER PUBLICATIONS

PCT Search Report and Written Opinion mailed Dec. 26, 2011 for PCT Application No. PCT/ US11/37783, 9 pages.

\* cited by examiner

*Primary Examiner* — Phuoc Doan
(74) *Attorney, Agent, or Firm* — Lee & Hayes, PLLC

(57) ABSTRACT

An electronic device and a telecommunication device that are locally connected and methods of utilizing those devices are described herein. The electronic device detects a pattern or duration of user interactions with a multidirectional control of the electronic device. Based on the pattern or duration and association data mapping patterns or durations to commands, the electronic device selects a command and then transmits the command to the telecommunication device. The telecommunication device enables a user to associate actions to be performed by the telecommunication device with patterns or durations of user interaction with the multidirectional control. Also, the telecommunication device receives a signal from the electronic device that is recognized as a command to perform an action, the recognition being based on association data mapping the signal to a pattern or duration of user interaction. The telecommunication device then performs the action.

20 Claims, 11 Drawing Sheets

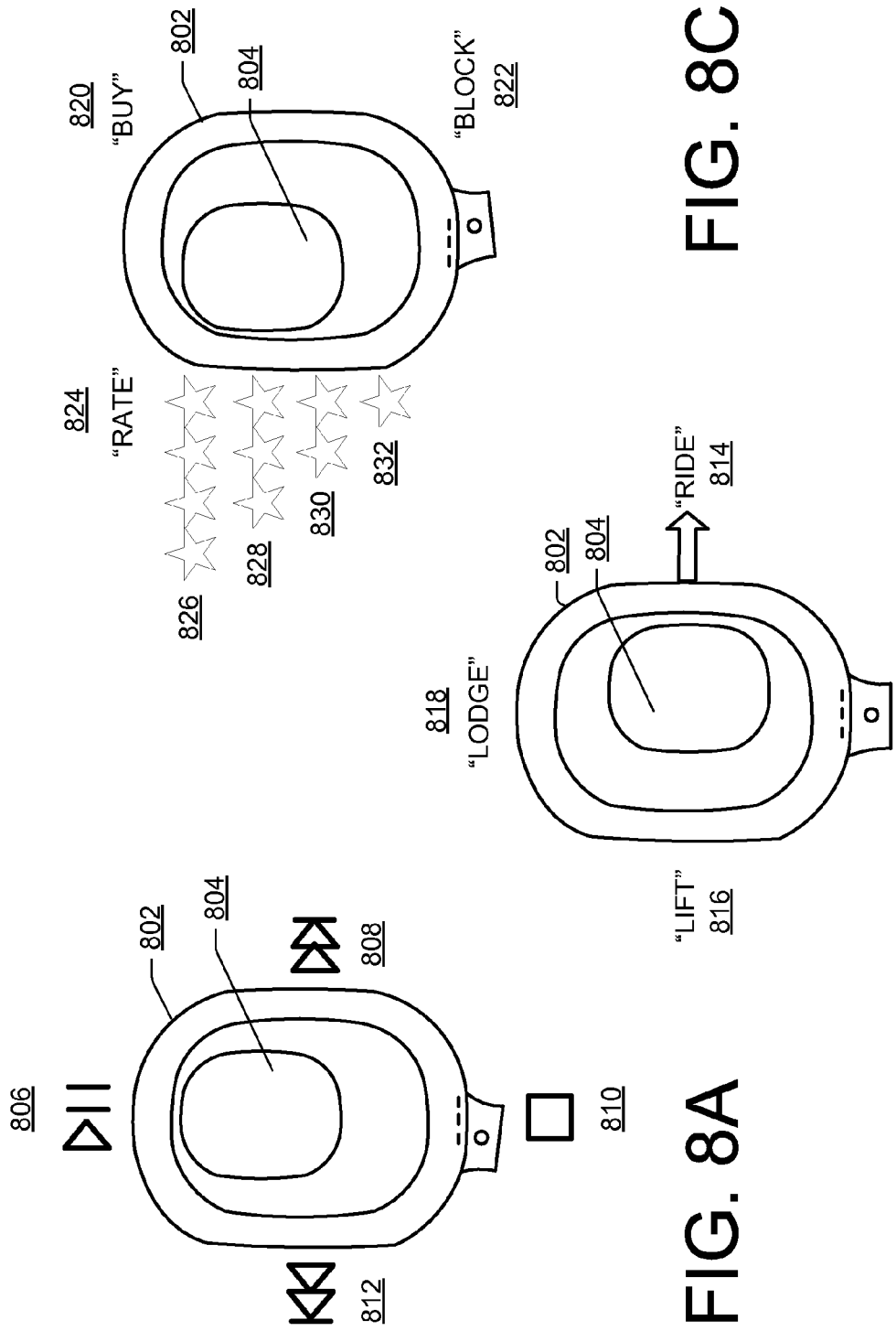

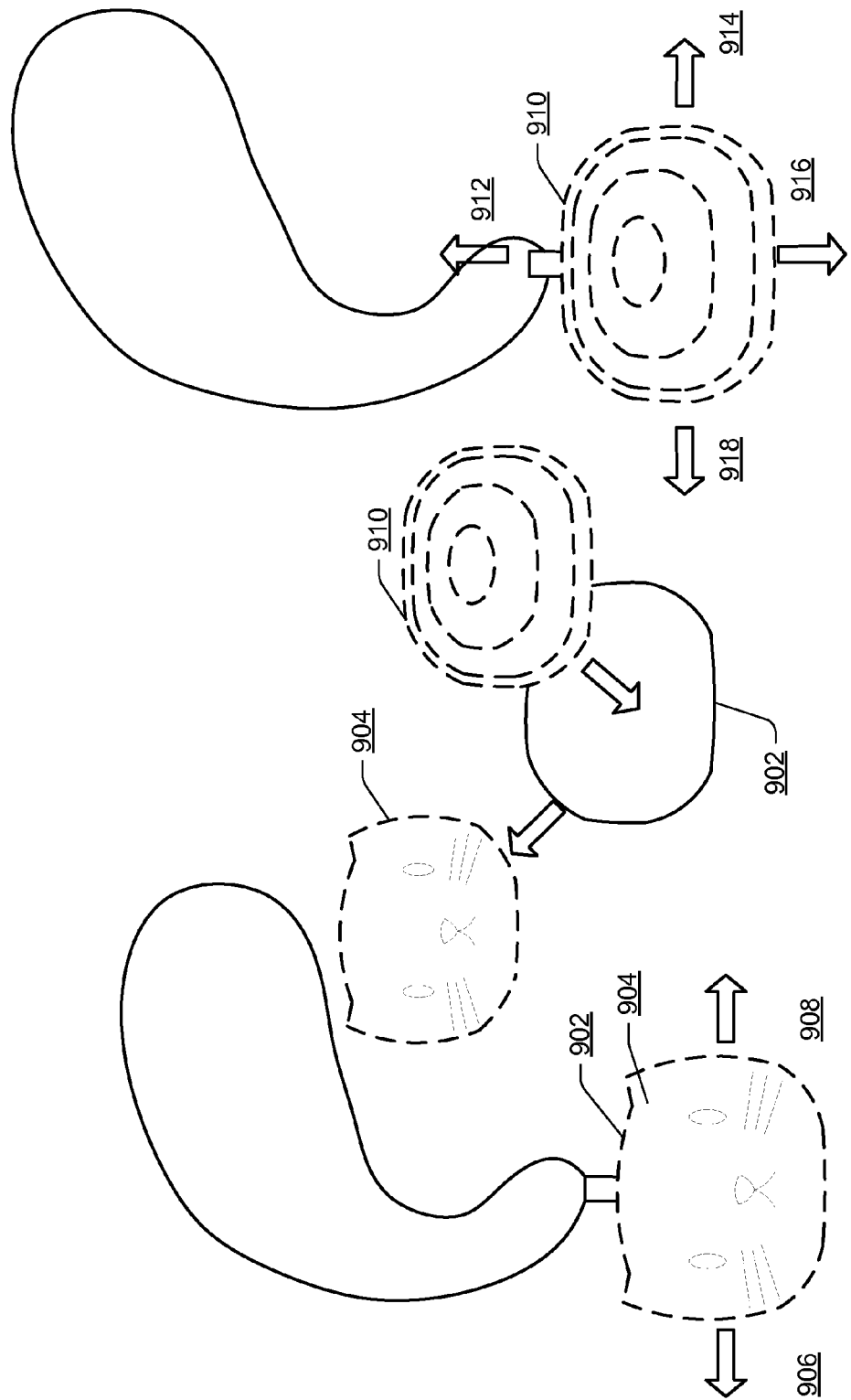

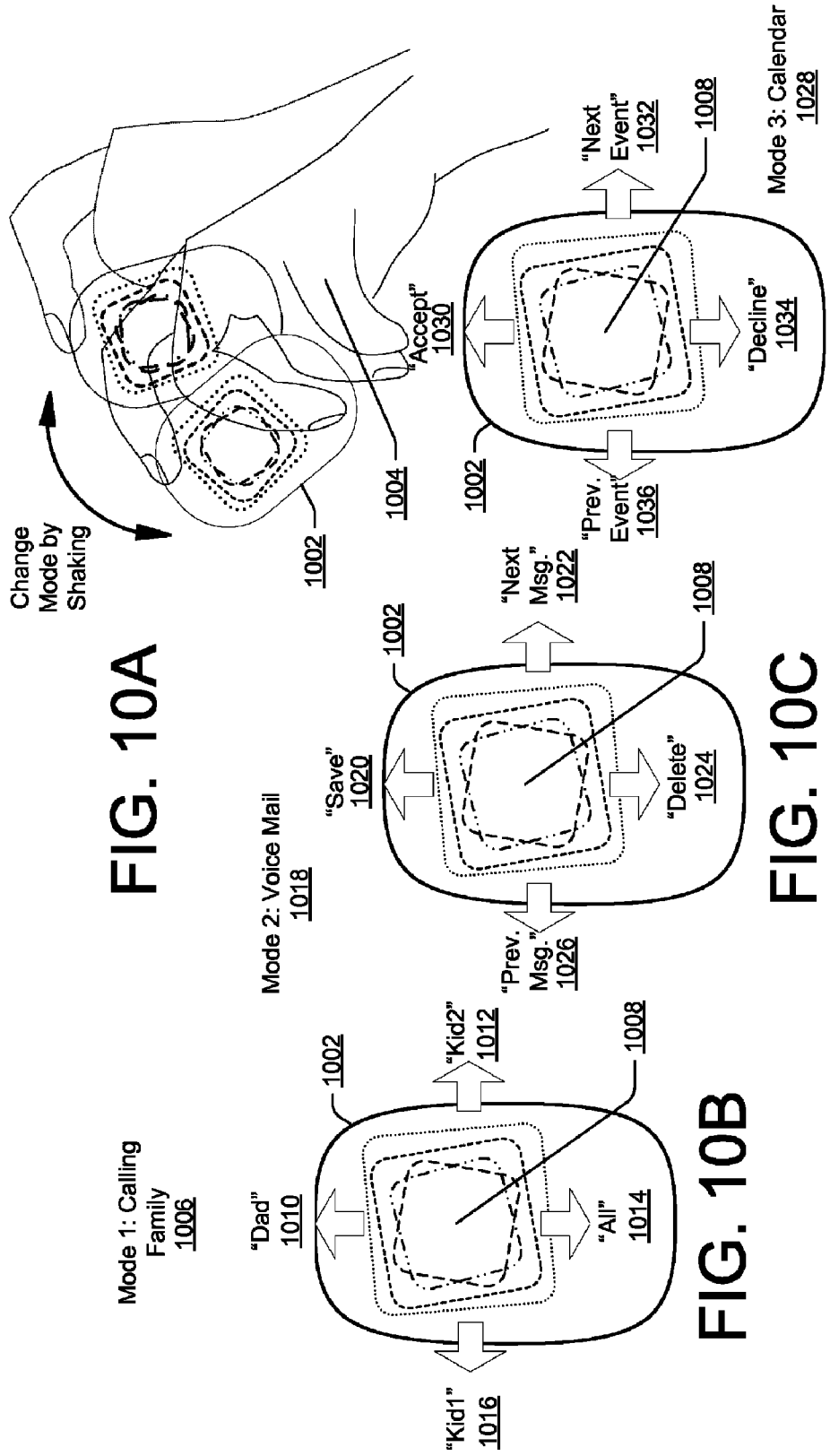

DEVICE WITH MULTIDIRECTIONAL CONTROL FOR SELECTING ACTIONS TO PERFORM ON A TELECOMMUNICATION DEVICE

BACKGROUND

Telecommunication devices have advanced from single purpose devices enabling voice calling to multi-purpose devices having an ever increasing number of capabilities. In addition to voice calling, telecommunication devices often include an email client, text messaging capabilities, instant messaging capabilities, device locating capabilities, such as global positioning system (GPS) capabilities, social networking applications, and a wide variety of third party applications. To utilize this myriad of applications and services, telecommunication devices often include several inputs. Such inputs include numeric keypads, alphanumeric keypads, touch screens, capacitive surfaces for scrolling, scroll wheels, cameras, microphones, and other input buttons. Coupled with these advances, telecommunication devices have maintained a relatively small form factor and in many instances have decreased in size. Controls included on such small form factor devices are often difficult to use and, in many cases, aren't used at all.

Concurrent with these advances, personal area networks offering wireless local connections, such as Bluetooth® connections, have enable telecommunication device users to pair their telecommunication devices with other devices or components, such as headsets. The headsets typically include a limited, defined set of inputs, such as a button for answering a call and a button for terminating a call, as well as a microphone and speaker.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIGS. 8a-8c are illustrations of example electronic devices with a multidirectional slider control, in accordance with various embodiments.

FIGS. 9a-9c are illustrations of example electronic devices with a multidirectional, attachable pendant control, in accordance with various embodiments.

FIGS. 10a-10d are illustrations of example electronic devices with a multidirectional, integrated control and multiple modes, in accordance with various embodiments.

DETAILED DESCRIPTION

Described herein are locally connected electronic devices and telecommunication devices. In some implementations, the local connection is a wireless connection, a personal area network (PAN) connection (such as a Bluetooth® connection), or a near-field connection. The electronic devices each include a control that is moveable with respect to a housing of an electronic device in a plurality of directions. Such electronic devices may be a watch, a key fob, a necklace pendant, a head set, glasses, a brooch, or a belt buckle. A user having one of these devices may interact with its attached control, moving the control in a pattern over a duration of time. The electronic device detects at least one of the pattern of movement or the duration and compares the detected pattern or duration to association data mapping patterns or durations of user interaction to commands for actions to be performed on a locally connected telecommunication device. In one implementation, this association data may have been provided to the electronic device by the telecommunication device. Based on the comparison, the electronic device selects a command and transmits the command over the local connection to the telecommunication device. Subsequently, the electronic device may receive feedback from the telecommunication device indicating success or failure of the command. The electronic device may then provide that feedback to its user through a visual, auditory, or haptic mechanism.

The telecommunication device enables users to associate actions performed on the telecommunication device with patterns or durations of user interactions with the control of the electronic device. For example, a pattern of a movement in an "up" direction followed by a movement in a "left" direction (with what is considered "up" and "left" varying from embodiment to embodiment) may be associated by the user with the initiation of a voice call to a specific contact. These user entered associations comprise at least a part of association data stored on the telecommunication device and provided to the electronic device.

Additionally, the telecommunication device receives signals from the electronic device via the local connection and recognizes the signals as commands to perform actions. The telecommunication device then performs the actions and provides feedback to the electronic device indicating success or failure of the command.

In some implementations, the telecommunication device is locally connected to a plurality of electronic devices.

Overview

Figure 1:
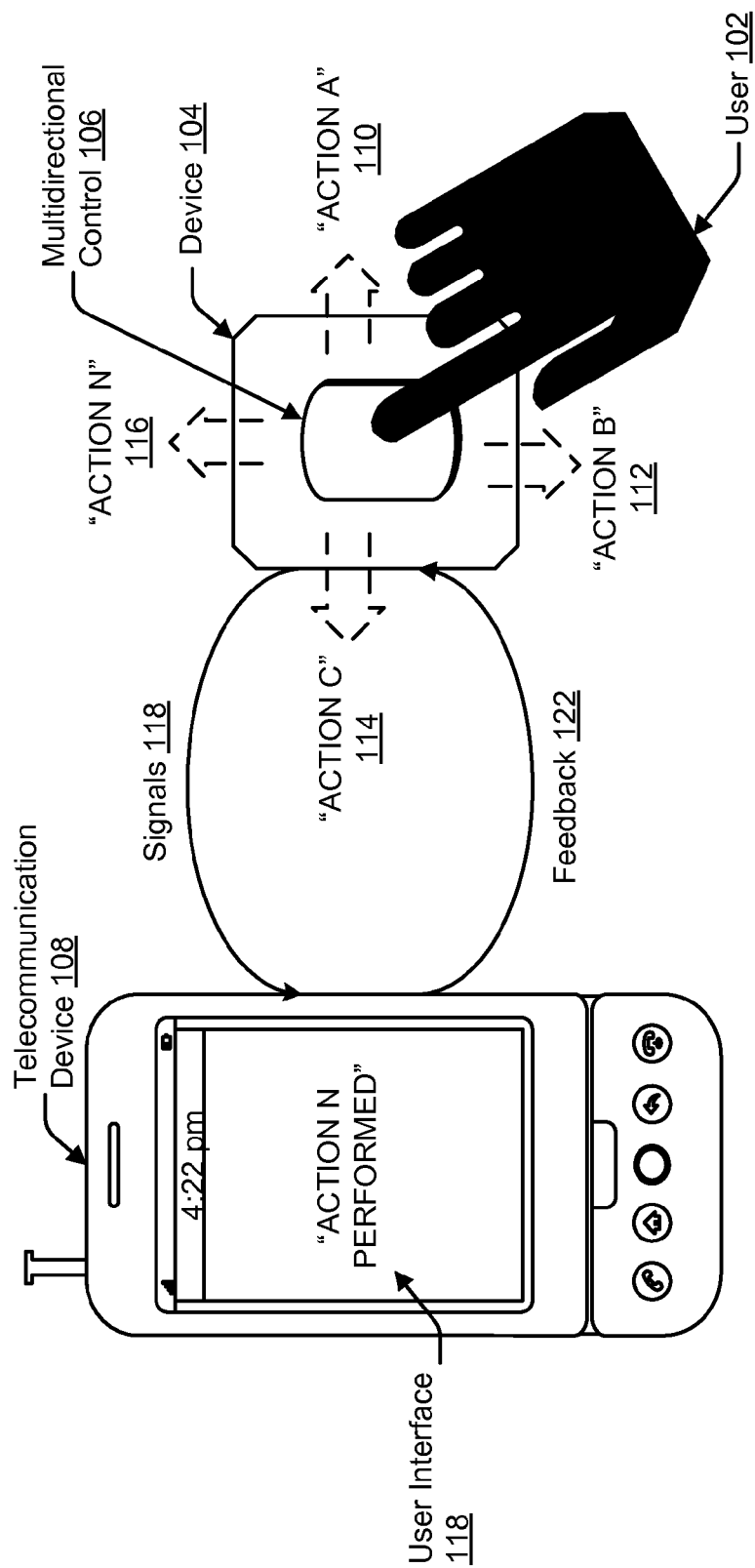
FIG. 1 is a block diagram showing an overview of an electronic device with a multidirectional control that enables a user to select an action to be performed on a locally connected telecommunication device by interacting with the control, in accordance with various embodiments.

FIG. 1 illustrates an overview of an electronic device with a multidirectional control that enables a user to select an action to be performed on a locally connected telecommunication device by interacting with the control, in accordance with various embodiments. As shown in FIG. 1, a user 102 interacts with an electronic device 104 by moving a multidirectional control 106 ("control 106") of the electronic device 104 in one or more directions or patterns over a duration of time, the control 106 being moveable with respect to a housing of the electronic device 104 in a plurality of directions. The patterns or durations of movement may be associated with actions to be performed on a telecommunication device 108 that is locally connected to the electronic device 104. For example, a movement of the control 106 in a "right" direction may be associated with an "Action A" 110. A movement of the control 106 in a "down" direction may be associated with an "Action B" 112. A movement of the control 106 in a "left" direction may be associated with an "Action C" 114. A movement of the control 106 in an "up" direction may be associated with an "Action N" 116. Based on the pattern or duration of movement, the electronic device 104 selects a command to perform an action and transmits the command as part of signals 118 to the telecommunication device 108. The telecommunication device 108 then performs the action indicated in the signals 118, displays a consequence of the action on a user interface 120 of the telecommunication device 108, and transmits feedback 122 to the electronic device 104 indicating the success or failure of the action. As illustrated in FIG. 1, the signals 118 include a command to perform "Action N" and the user interface 120 displays a message stating "Action N Performed."

In various embodiments, the electronic device 104 is an item carried or worn by the user 102. For example, the electronic device 104 may be one of a watch, a key fob, a necklace pendant, a head set, glasses, a brooch, or a belt buckle, or may simply be a small item easily carried in a user's pocket, purse, or other apparel or accessory. These examples are provided simply for the sake of illustration, however. The electronic device 104 may be any sort of item. The type of multidirectional control 106 coupled to the electronic device 104 may vary based on the sort of item that the electronic device 104 is. For instance, if the electronic device 104 is a watch, the control 106 may be a watch face. If the electronic device 104 is a necklace pendant, the control 106 may be a stone or metal attached to the pendant. In one implementation, the electronic device 104 may even have interchangeable control. Various example combinations of electronic devices 104 and controls 106 are illustrated in FIGS. 6-10 and are described in greater detail below.

Figure 11:
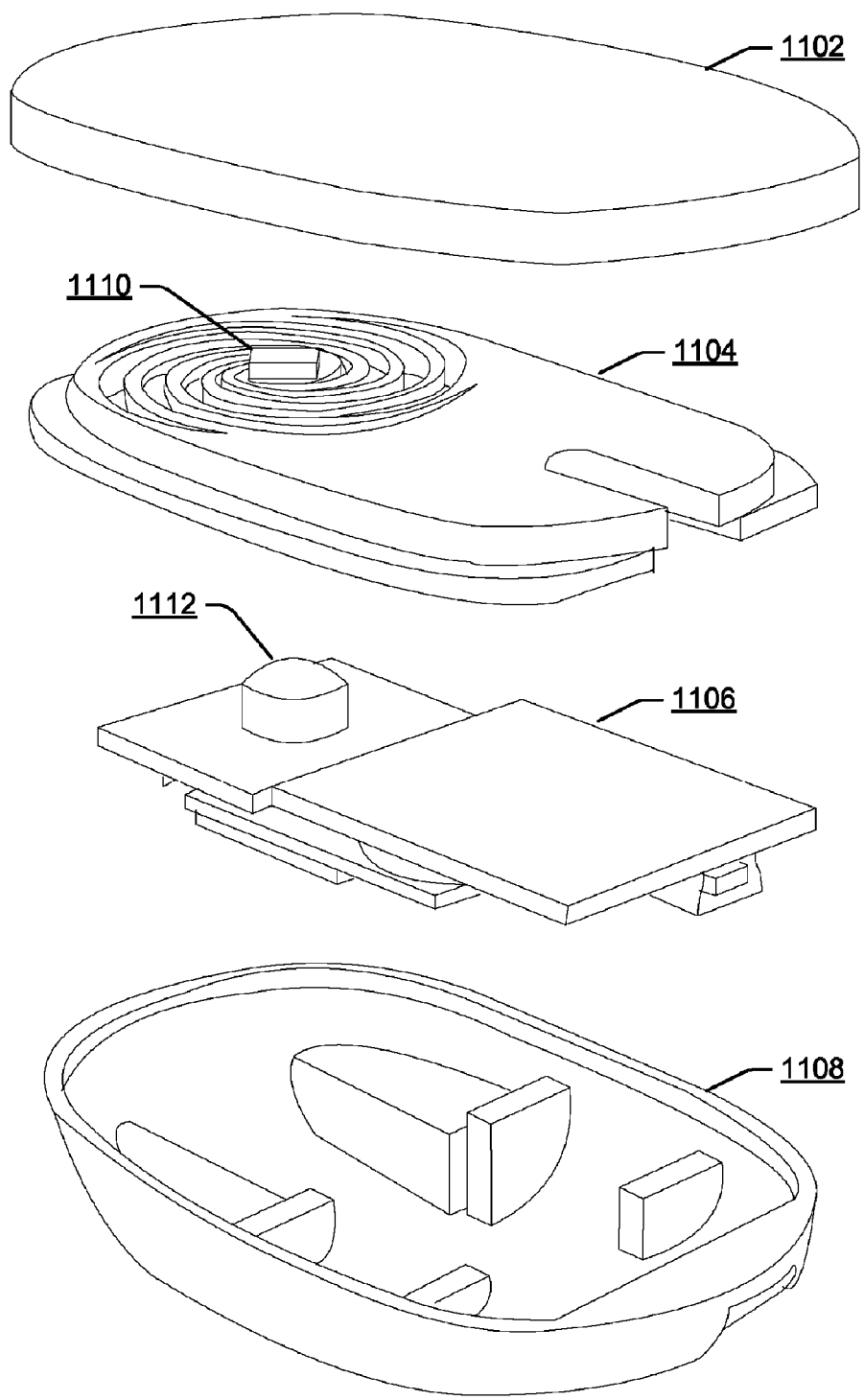
FIG. 11 is an exploded view of an electronic device housing and internal components, in accordance with various embodiments.

In addition to an item being carried or worn, the electronic device 104 may be any sort of computing device including at least a processor and temporary or permanent storage. For example, the electronic device 104 may be a telecommunication device, a personal digital assistant (PDA), a tablet computer, a media player, a digital video recorder, a game device, or any other sort of device. An exploded view of a housing and internal parts of an electronic device 104 is illustrated in FIG. 11 and is described below in greater detail with reference to that figure. Also, various components of an example electronic device 104 are illustrated in greater detail in FIG. 2 and are described in detail below with reference to that figure.

In some embodiments, the control 106 is simply a physical component made of metal, plastic or another material and includes no electronics. In other embodiments, the control 106 may include electronics capable of transmitting signals to other electronic components of the electronic device 104. Also, the control 106 may have a shape or features that facilitate user interaction, such as bumps or ridges that make it easier for the user 102 to move the control 106 with respect to the other parts of the electronic device 104. The control 106 may additionally have an "at rest" position and may be moveable in any number and combination of directions. An "at rest" position is a position that the control 106 returns to when user interaction with the control 106 is completed. For example, the control 106 may be centered on one surface of an electronic device 104, such as a "top" of the device (with what is considered "top" varying from embodiment to embodiment), when "at rest." From the "at rest" position, the control may be moved in any number of ways. Movements may be limited to a preset number of locations or may be freely moved in any direction from and back to the at rest position. In some implementations, the control may be moved from the "at rest" position to another position and from that other position to yet another position without first returning to the "at rest" position. Such movements may be associated with a user experience similar to that of rubbing two coins together. In yet other embodiments, the control 106 may not be associated with any "at rest" position and may remain wherever it is when the user 102 finishes interacting with the control 106.

In FIG. 1, a series of example movements of control 106 and actions 110-116 associated with those movements are shown. A movement in a "right" direction from the "at rest" position (with what is considered "right" varying from embodiment to embodiment) is associated with an "Action A" 110 that is performed on the telecommunication device 108. Also, a movement in a "down" direction from the "at rest" position is associated with an "Action B" 112, a movement in a "left" direction from the "at rest" position is associated with an "Action C" 114, and a movement in an "up" direction from the "at rest" position is associated with an "Action N" 116 (with what is considered "down," "left," and "up" varying from embodiment to embodiment). These movements illustrate only a small subset of the movements that may be associated with actions 110-116. In addition to patterns including a single linear, arced, or circular movement, patterns comprising an amount of one such movement or patterns combing two or more of such movements (such as up-down-left) within a predetermined time of one another may be associated with an action (e.g., "Action N" 116). Further, rather than a tracking a series of movements, the electronic device 104 may simply measure the duration of movements and may be agnostic as to the nature of the movements. In such an implement, a first action may be associated with a first duration (e.g., 5 seconds) and a second action may be associated with a second duration (e.g., 10 seconds). In further implementations, an action may be associated with a combination of a pattern and duration of movement.

Also, in various embodiments, the electronic device 104 may have multiple modes such that the same movement/ pattern or duration of user interaction is associated with a first action in a first mode and a second action in a second mode. The user may set the mode through additional interaction with the electronic device 104. For example, the user might switch the mode by shaking the electronic device 104 or by interacting with an additional control on the electronic device 104, such as a switch (not shown) having multiple settings, one associated with each mode.

As shown in FIG. 1, in response to patterns or duration of user interactions, the electronic device 104 transmits a signal 118 to the telecommunication device 108, the signal 118 including a command to perform an action associated with a pattern or duration of user interaction. In response, the electronic device 104 receives feedback 112 indicating success or failure of the action. Upon receiving the feedback 122, the electronic device 104 may convey the feedback to the user 102 through visual, auditory, or haptic mechanisms, or some combination thereof. For example, the electronic device 104 may vibrate for a first length of time (e.g., 5 seconds) to indicate success and for a second length of time (e.g., 10 seconds) to indicate failure.

Additional components of the electronic device 104 for detecting patterns or duration of user interaction with the control 106, for determining a mode, for selecting a command to perform an action based on the user interaction, for communicating with the telecommunication device 108, and for providing feedback are described below with reference to FIG. 2 in further detail.

Figure 3:
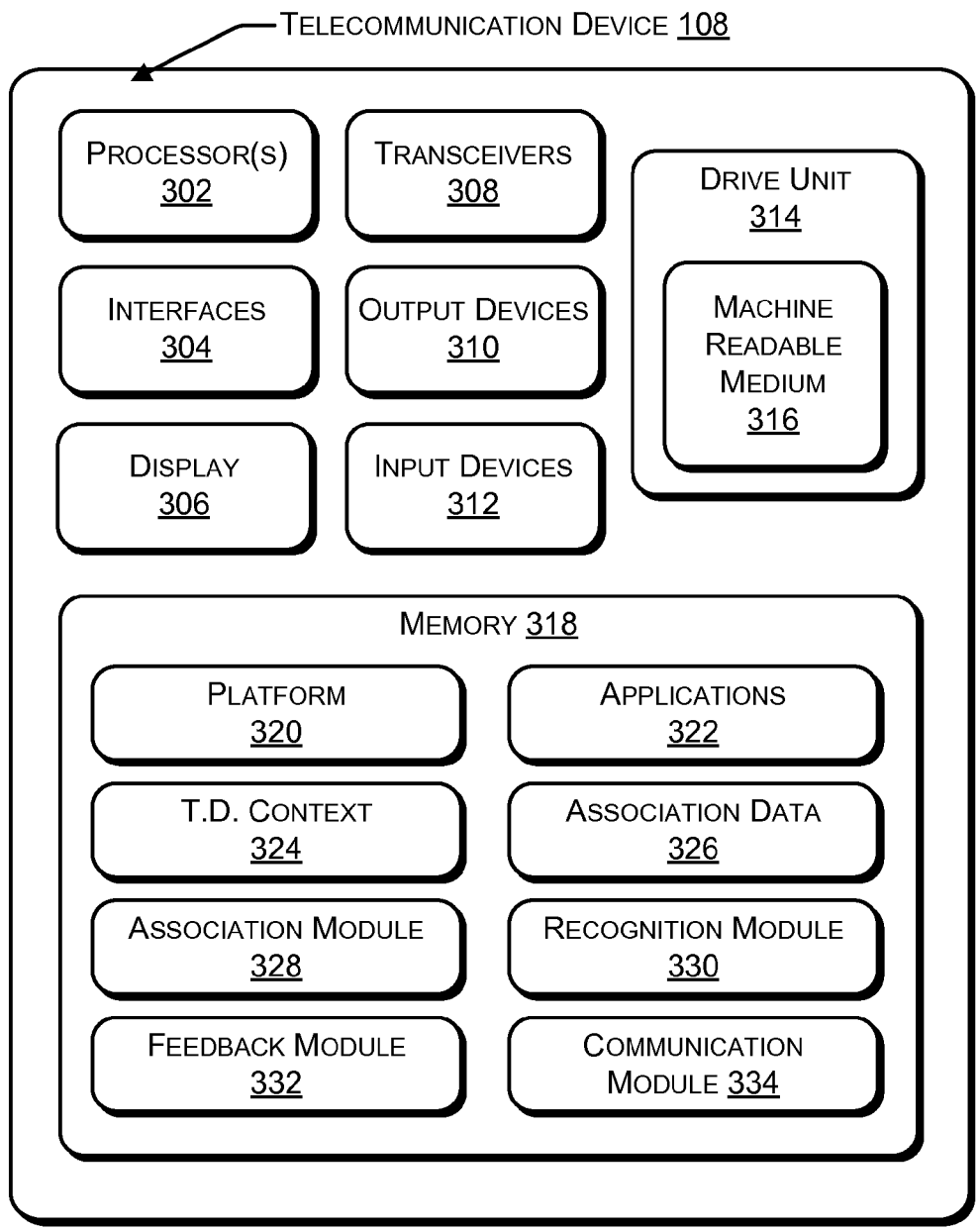
FIG. 3 is a block diagram of an example telecommunication device system architecture, in accordance with various embodiments.

In various embodiments, the telecommunication device 108 is any sort of computing device. The telecommunication device 108 can be a cellular phone, a PDA, a personal computer (PC), a laptop computer, a workstation, a server system, a tablet computer, a television, a media player, a digital video recorder, a game device, or a set-top box, or any other sort of device. A telecommunication device 108 is illustrated in FIG. 3 and is described below in further detail in reference to that figure.

The telecommunication device 108 can belong to the same user 102 as the electronic device 104 and, in some embodiments, may be paired to the electronic device 104 through, e.g., Bluetooth® pairing. In one embodiment, the telecommunication device 108 is paired to or otherwise locally connected to a plurality of electronic devices 104. For instance, a user 102 may have both a necklace and a watch and both the necklace and the watch may be electronic devices 104. In such an embodiment, each electronic device 104 may be associated with a different application or feature of the telecommunication device 108. For example, the watch may be associated with voice calling and the necklace with text messaging. Such electronic devices 104 may even be purchased with programming specific to a telecommunication device application to enable the connection of the multiple electronic devices 104 with the telecommunication device 108.

As discussed above, the pairing and local connection may be achieved through any one or more networks, such as a local area network (LAN) or a PAN, such as a Bluetooth® network. Communications between the telecommunication device 108 and electronic device 104 utilize any sort of communication protocol known in the art for sending and receiving messages. Additionally, the telecommunication device 108 may have a further network connection to one or more remote service provider networks or other networks, such as cellular networks and/or data networks, including wide area networks (WANs), LANs, PANs, and/or the Internet.

In FIG. 1, the telecommunication device 108 is shown receiving signals 118 via the local connection. Upon receiving the signals 118, the telecommunication device 108 recognizes a command to perform an action based on association data of the telecommunication device 108. The action may be associated with an application or feature of the telecommunication device 108, such as "answer voice call" or "decrease volume." The association data maps the signals 118 to a pattern or duration of user interaction with the control 106, the pattern or duration being associated with the action. To create the association data, the telecommunication device 108 may further enable the user 102 to select a pattern or duration of user interaction with the control 106 and an action or set of actions associated with the patter or duration. The telecommunication device 108 may enable the user to select the pattern or duration through a user interface, such as user interface 120.

In some embodiments, the telecommunication device 108 may not recognize the signal 118 and may communicate with a remote server, such as a server of a service provider network, to resolve the signal 118. The remote server may, for example, be aware of signals for commands that may be preprogrammed on the electronic device 104 that the telecommunication device 108 is unaware of.

Upon recognizing the command to perform the action, the telecommunication device 108 performs the action and provides feedback 122 indicating a result of the action (e.g., "success" or "failure"). Also, the telecommunication device 108 may render to a display a user interface 120 visually indicating the result to the user 102 through the telecommunication device 108. For example, if the signal 118 indicated a command to perform "Action N", the user interface 120 might display "Action N Performed."

Example System Architectures

Figure 2:
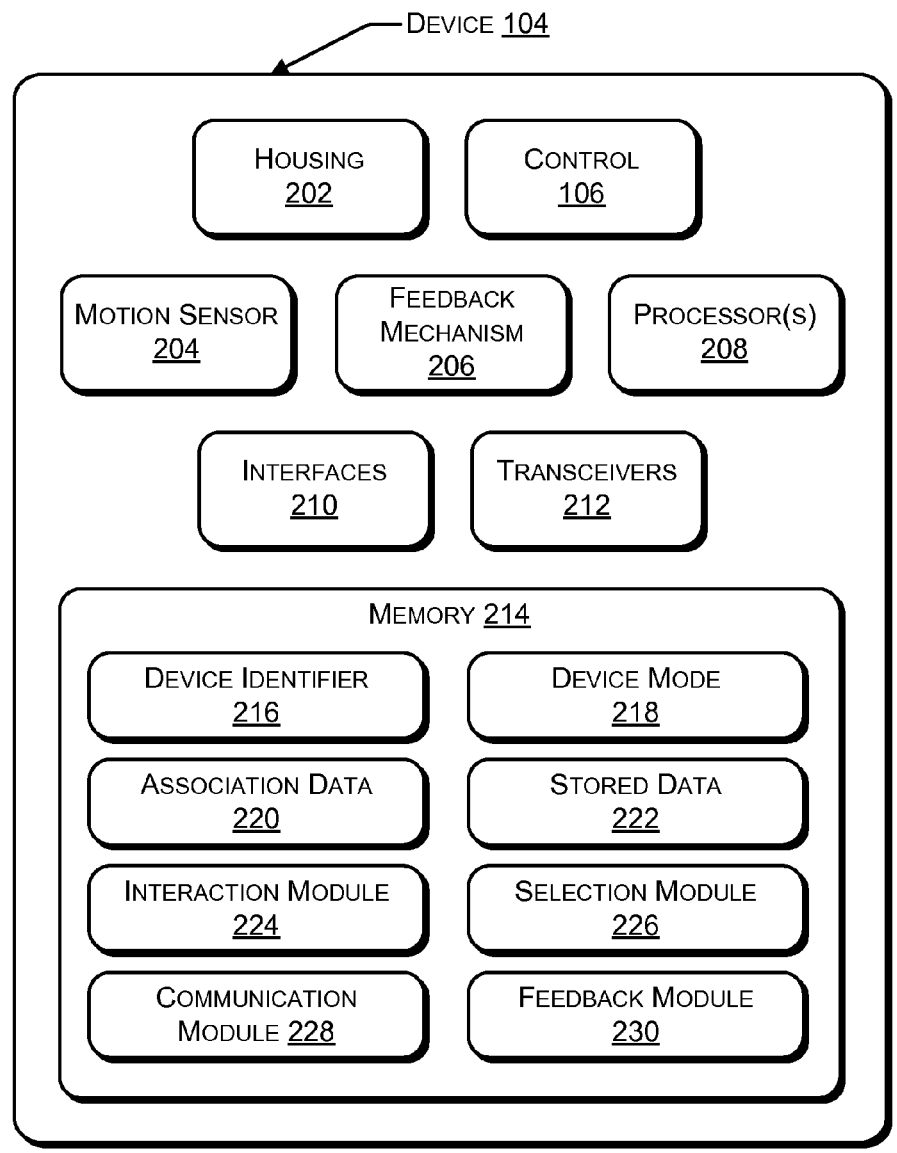
FIG. 2 is a block diagram of an example electronic device system architecture, in accordance with various embodiments.

FIG. 2 illustrates an example electronic device system architecture, in accordance with various embodiments. As shown, the electronic device 104 includes a housing 202, the multidirectional control 106, a motion sensor 204, a feedback mechanism 206, processor(s) 208, interfaces 210, and transceivers 212. The electronic device 104 further includes a memory 214, the memory storing a device identifier 216, a device mode setting 218, association data 220, stored data 222, an interaction module 224, a selection module 226, a communication module 228, and a feedback module 230.

In some embodiments, the housing 202 is formed from any sort of material, such as plastic, metal, or a composite material. The housing 202 includes the external parts of the electronic device 104 and partially or completely encases other internal components. In one implementation, the housing 202 comprises two pieces snapped, glued, or otherwise attached to one another. An exploded view of an electronic device 104 with such a housing 202 is illustrated in FIG. 11 and is described in further detail below with reference to that figure. In addition to encasing the other components, the housing 202 may also include an attachment mechanism to the control 106. As mentioned above, the control 106 may be externally disposed and attached to the housing 202. In other implementations, though, the control 106 may form an integral part of the housing 202. For example, the control 106 could be a capacitive surface for detecting user touch and motion (e.g., a touch pad). Further, the housing 202 may have any color and combination of decorative features and may be part of an "everyday" device such as a watch, necklace, glasses, or belt buckle.

Within the housing 202, the electronic device 104 includes a motion sensor 204 or other component capable of allowing the user 102 to provide additional user interaction for selecting a mode. A motion sensor 204, for example, could detect a shaking of the electronic device 104 sufficient to indicate a mode switch. Such a motion sensor 204 may further detect a degree of motion and ignore small movements, thus requiring that the user 102 shake the electronic device 104 with a sufficient force to switch the mode. In other embodiments, rather than a motion sensor 204 internal to the housing 202, the housing 202 may include an integrated switch or slider with a number of possible settings. Such a switch could, for instance, have four possible positions, each associated with one electronic device mode. The switch or slider may be disposed on an opposite or perpendicular surface to the surface having the control 106 to allow for ease of movement of the control 106.

Besides the control 106, the housing 202 may also include an integrated feedback mechanism 206. The feedback mechanism 206 may be any sort of output device known in the art, such as a display, a light bulb, one or more light emitting diodes (LEDs), speakers, a vibrating mechanism, or a tactile feedback mechanism. For example, the housing 202 might include an opening for two light bulbs, one red and one green.

The green bulb is lit to indicate success of the command and the red is lit to indicate failure of the command. In another example, the housing 202 includes a cover or cap for a speaker, the speaker producing a first sound to indicate success and a second to indicate failure. In yet another example, the feedback mechanism 206 is entirely internal to the housing 202 and comprises a vibrating mechanism that vibrates at different intensities and durations to indicate different results.

In some embodiments, as mentioned above, the electronic device 104 includes processor(s) 208 within the housing 202. The processor(s) 208 are central processing unit(s) (CPU) or other processing unit(s).

In various embodiments, interfaces 210 may be communicatively coupled to the processor(s) 208. The interfaces 210 may be any sort of interfaces. Interfaces 210 include any one or more of a wireless LAN interface or a near field interface. The a wireless LAN interface can include a Wi-Fi interface or a Wi-Max interface, or a Bluetooth® interface that performs the function of transmitting and receiving wireless communications using, for example, the IEEE 802.11, 802.16 and/or 802.20 standards. For instance, the electronic device 104 can use a Wi-Fi interface to communicate directly with the telecommunication device 108. The near field interface can include a Bluetooth® interface or RFID for transmitting and receiving near field radio communications via a near field antenna. For example, the near field interface may be used for functions, as is known in the art, such as communicating directly with nearby devices that are also, for instance, Bluetooth® or RFID enabled. A reader/interrogator may be incorporated into the electronic device 104.

In some embodiments, the processor(s) 208 are also communicatively coupled to transceiver(s) 212. The transceiver(s) 212 include any sort of transceivers. For example, transceiver(s) 212 may include a radio transceiver and interface that performs the function of transmitting and receiving radio frequency communications via an antenna.

In various embodiments, the processor(s) 208 are further communicatively coupled to memory 214. The memory 214 generally includes both volatile memory and non-volatile memory (e.g., RAM, ROM, EEPROM, Flash Memory, miniature hard drive, memory card, or any other medium). Memory 214 can also be described as computer storage media and may include volatile and nonvolatile, removable and non-removable media implemented in any method or technology for storage of information, such as computer readable instructions, data structures, program modules, or other data.

As shown in FIG. 2, the memory 214 stores data and modules 216-230. These data and modules 216-230 include a device identifier 216. The device identifier 216 is a value such as integer or string that uniquely identifies the electronic device 104. Such a device identifier 216 may be stored in any part of the memory 214 and may be associated with an application, module, process, or thread, or may be stored in a part of memory 214 that is accessible to all application, modules, processes, and threads of the electronic device 104. In one embodiment, the device identifier 216 is a read-only value that is programmed into memory 214 prior to or at the time of sale of the electronic device 216.

In various embodiments, the memory 214 also stores a device mode 218. The device mode 218 may be any sort of value, such as a Boolean, an integer or other number, or a string that identifies a current mode of the electronic device 104. In one embodiment, when the electronic device 104 only has a single mode, the device mode 218 may be set to null. Such a device mode 218 may be stored in any part of the memory 214 and may be associated with an application, module, process, or thread, or may be stored in a part of memory 214 that is accessible to all application, modules, processes, and threads of the electronic device 104. Also, the device mode 218 may be a read-writable value that can be read or updated, for example, by the interaction module 224.

The memory 214 further stores association data 220. The association data 220 may be preprogrammed into memory 214 prior to or at the time of sale of the electronic device 104 or may be received from the telecommunication device 108 upon pairing or establishing a local connection with the telecommunication device 108. As described above, the association data 220 may comprise a set of mappings. Signals 118 recognized by the telecommunication device 108 as commands to perform actions are associated with the actions, the pattern of duration of user interaction and, optionally, a device mode 218. For example, a duration of five seconds of user interaction while the electronic device 104 is in a first mode may be mapped in association data 220 to a first signal. Likewise, a duration of five seconds while the electronic device is in a second mode may be mapped in association data 220 to a second signal. In some embodiments, the association data 220 may be implemented as a table, file, or any other sort of data structure. The association data 220 may be stored in any part of the memory 214 and may be associated with an application, module, process, or thread, or may be stored in a part of memory 214 that is accessible to all application, modules, processes, and threads of the electronic device 104.

In some embodiments, memory 214 may optionally include stored data 222. The stored data 222 may be preprogrammed content, such as a song, picture, or theme that is stored in memory 214 prior to or at the time of sale of the electronic device 104. The stored data 222 may be provided to the telecommunication device 108 when the electronic device 104 and telecommunication device 108 pair, establish a connection, or at some other time. For example, the stored data 22 may be transmitted along with a command or may be associated with a pattern or duration of user interaction and transmitted in place of a command.

In various embodiments, the memory 214 stores an interaction module 224 that is programmed to be operated by the processor(s) 208 to detect user interactions, to set the device mode 218, and to invoke selection module 226 upon completion of user interaction. The interaction module 224 may comprise any number of sub-modules, applications, threads, or processes and may include stored data associated with the interaction module 224.

Upon initiation of user interaction with the control 106, the interaction module 224 begins to track the user interaction, noting movements, a time since the initiation of the user interaction, or both. The interaction module 224 tracks user interaction by communicating with a driver component associated with the control 106 or some other mechanism. In one implementation, multiple movements are made within a threshold time period of one another if they are to be considered part of the same duration or pattern. To measure duration, the interaction module 224 either includes a clock or makes reference to some other clock included within the electronic device 104. As movements and duration are measured, they are written to one or more variables of the interaction module 224. The interaction module 224 may further determine that the user interaction is completed by determining that a predetermined time period has passed since the last user interaction was noted. Upon completion of the user interaction, the interaction module 224 invokes the selection module 226 and provides the selection module 226 with the pattern, duration, or pointer(s) to the pattern or duration.

In various embodiments, the interaction module 224 is further configured to track user interactions affecting a mode change and to update the device mode 218 based on the user interactions. For example, the interaction module 224 could communicate with a driver or other software of the motion sensor 204 or other component to receive notification of a user interaction. In some embodiments, the interaction module 224 is only notified of user interactions affecting a mode change and user interactions with the control 106. In other embodiments, the interaction module 224 is notified of all interactions (e.g., all motion detected by the motion sensor 204) and differentiates among the interactions based on rules and thresholds to determine interactions that indicate a user's 102 intention to switch the device mode 218. Upon determining that user interaction affecting a mode change has occurred, the interaction module 224 updates the device mode 218. In some embodiments, this may involve examining a list of possible device modes 218 and selecting the next device mode 218 in the list. If the current device mode 218 is the last item in the list, the next item may be the first item in the list.

In some embodiments, the selection module 226 may comprise any number of sub-modules, applications, threads, or processes and may include stored data associated with the selection module 226. As mentioned above, the selection module 226 is invoked by the interaction module 224 and is passed a pattern or a duration of user interactions or a pointer to a pattern or duration. If passed a pointer, the selection module 226 retrieves the pattern or duration from the referenced memory location. The selection module 226 then retrieves the device mode 218 from memory 214. With the pattern or duration of user interaction and the device mode 218 received or retrieved, the selection module 226 compares the pattern or duration and the device mode 218 to the mappings in the association data 220 to determine a signal corresponding to the pattern or duration and the device mode 218. In one embodiment, the device mode 218 is null, indicating that the electronic device 104 has only a single mode 218. In such an embodiment, the selection module 226 may compare only the pattern or duration to the mappings in the association data 220 to determine a signal. In another embodiment, the device mode 218 is not null but is nonetheless not utilized in determining the signal. In such an embodiment, the device mode 218 may be transmitted along with the signal for use by the telecommunication device 108 in determining what action to perform. As mentioned above, the signals included in the association data 220 are recognized by the telecommunication device 108 as commands to perform actions. Once the selection module 226 has selected a signal from the association data 220 based on the comparison, the selection module 226 invokes the communication module 228 to transmit the signal. In some embodiments, the selection module 226 includes the signal in a message that further includes the device identifier 216 to enable the telecommunication device 108 to handle the signals based on the identity of the electronic device 104. The message also optionally includes the device mode 218.

In various embodiments, the communication module 228 may comprise any number of sub-modules, applications, threads, or processes and may include stored data associated with the communication module 228. The communication module 228 is configured to send and receive messages via the local connection between the electronic device 104 and telecommunication device 108. The communication module 228 may communicate with the interfaces 210 or transceivers 212 to send and receive messages via the interfaces 210 or transceivers. As shown in FIG. 1, these messages may include signals 118 and feedback 122. In some embodiments, in addition to sending and receiving messages, the communication module 228 may participate in pairing the electronic device 104 to the telecommunication device 108 or in establishing the local connection. Also, as mentioned above the communication module 228 may be invoked by the selection module 226 and may be passed a signal or message including a signal to transmit to the telecommunication device 108. Further, the communication module 228 may receive, via the interfaces 210 or transceivers 212, feedback 122 from the telecommunication device 108. In response to receiving the feedback 122, the communication module 228 invokes the feedback module 230 to process the feedback 122.

In some embodiments, the feedback module 230 may comprise any number of sub-modules, applications, threads, or processes and may include stored data associated with the feedback module 230. The feedback module 230 receives feedback 122 via the communication module 228 indicating the success or failure of a command transmitted as a signal 118 to the telecommunication device 108. The feedback 122 may be a simple Boolean, with '1' indicating success and '0' indicating failure, or may be a string with possible values such as "success" or "failure." Feedback 122 may also indicate success or failure in any number of ways. Upon receiving the feedback 122, the feedback module 230 interfaces with a driver or other software of the feedback mechanism 206 and commands the feedback mechanism to do one of a number of things based on the feedback 122. For example, if the feedback mechanism 206 are the green and red lights mentioned above, and the feedback 122 is "success," the feedback module 230 may instruct the feedback mechanism 206 to turn on the green light for some specified period of time to indicate success to the user 102.

FIG. 3 illustrates an example telecommunication device system architecture, in accordance with various embodiments. As shown, the telecommunication device 108 may include processor(s) 302, interfaces 304, a display 306, transceivers 308, output devices 310, input devices 312, and drive unit 314 including a machine readable medium 316. The telecommunication device 108 further includes a memory 318, the memory storing a platform (comprising an operating system and applications) 320, applications 322, a telecommunication device context setting 324, association data 326, an association module 328, a recognition module 330, a feedback module 332, and a communication module 334.

In some embodiments, the processor(s) 302 is a central processing unit (CPU), a graphics processing unit (GPU), or both CPU and GPU, or any other sort of processing unit.

In various embodiments, the interfaces 304 are any sort of interfaces. Interfaces 304 include any one or more of a wireless LAN interface, or a near field interface. The a wireless LAN interface can include a Wi-Fi interface or a Wi-Max interface, or a Bluetooth® interface that performs the function of transmitting and receiving wireless communications using, for example, the IEEE 802.11, 802.16 and/or 802.20 standards. For instance, the telecommunication device 108 can use a Wi-Fi interface to communicate directly with a nearby device. The near field interface can include a Bluetooth® interface or RFID for transmitting and receiving near field radio communications via a near field antenna. For example, the near field interface may be used for functions, as is known in the art, such as communicating directly with nearby devices that are also, for instance, Bluetooth® or RFID enabled. A reader/interrogator may be incorporated into telecommunication device 108.

In various embodiments, the display 306 is a liquid crystal display or any other type of display commonly used in telecommunication devices. For example, display 306 may be a touch-sensitive display screen, and can then also act as an input device or keypad, such as for providing a soft-key keyboard, navigation buttons, or the like.

In some embodiments, the transceivers 308 include any sort of transceivers known in the art. For example, transceivers 308 may include a radio transceiver and interface that performs the function of transmitting and receiving radio frequency communications via an antenna. The radio interface facilitates wireless connectivity between the telecommunication device 108 and various cell towers, base stations and/or access points.

In some embodiments, the output devices 310 include any sort of output devices known in the art, such as a display (already described as display 306), speakers, a vibrating mechanism, or a tactile feedback mechanism. Output devices 310 also include ports for one or more peripheral devices, such as headphones, peripheral speakers, or a peripheral display.

In various embodiments, input devices 312 include any sort of input devices known in the art. For example, input devices 312 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The machine readable medium 316 stores one or more sets of instructions (e.g., software) embodying any one or more of the methodologies or functions described herein. The instructions may also reside, completely or at least partially, within the memory 318 and within the processor(s) 302 during execution thereof by the telecommunication device 108. The memory 318 and the processor(s) 302 also may constitute machine readable media 316.

In various embodiments, memory 318 generally includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). Additionally, in some embodiments, memory 318 includes a SIM (subscriber identity module) card, which is a removable memory card used to identify a user of the telecommunication device 108 to a service provider network. Memory 318 can also be described as computer storage media and may include volatile and nonvolatile, removable and non-removable media implemented in any method or technology for storage of information, such as computer readable instructions, data structures, program modules, or other data.

As illustrated in FIG. 3, the memory 318 store data and modules 320-334. These data and modules 320-334 include a platform 320. In various embodiments, the platform 320 includes an operating system and one or more applications that are pre-programmed on the telecommunication device 108 at the time of initiation of the user's telecommunication services or prior to that time. The operating system may be any sort of telecommunication device operating system, and the applications may be any sort of applications, such as an email client, a calendar, a contact book, a text messaging client, a GPS component, a browser, etc.

Additionally, the data and modules 320-334 further include other applications 322, such as third party applications, enhancing the telecommunication device 108 with various capabilities.

In various embodiments, in addition to platform 320 and applications 322, the memory 318 further stores a telecommunication device context 324. The telecommunication device context 324 may be any sort of value, such as a Boolean, an integer or other number, or a string that identifies a current context of the telecommunication device 108 (e.g., "email client open, reading emails"). In one embodiment, the telecommunication device context 324 may be stored in any part of the memory 318 and may be associated with an application, module, process, or thread, or may be stored in a part of memory 318 that is accessible to all application, modules, processes, and threads of the telecommunication device 108. Also, the telecommunication device context 324 may be a read-writable value that can be updated, for example, by the platform 320 or applications 322.

In some embodiments, the memory 318 further stores association data 326. The association data 326 may be the same as or similar to the association data 220 described above. The association data 326 may include mappings of received signals to actions to be performed by the telecommunication device 108, a pattern or duration of user interactions, and a telecommunication device mode 218 associated with that action and signal. And like association data 220, the association data 326 may be implemented as a table, file, or other structure. The association data 326 may differ, however, by including a telecommunication device context 324 associated with a mapping such that the same signal and pattern or duration of user interactions may result in performance of a different action based on the telecommunication device context 324. Also, the association data 326 may include mappings for a plurality of electronic devices 104, each identified by a device identifier 216 received with the signals 118.

In various embodiments, the memory 318 stores an association module 328 that is programmed to be operated by the processor(s) 302 to enable the user 102 to associate patterns or durations of user interactions performed on electronic device 104 with a certain action and to associate an electronic device 104 or mode of an electronic device 104 with a group of actions, an application 320/322, or another feature of the telecommunication device 108. The association module 328 may comprise any number of sub-modules, applications, threads, or processes and may include stored data associated with the association module 328.

In various embodiments, the association module 328 may be a component of an application of the platform 320 or of another application 322 and may comprise a user interface launched from the application 320/322 through selection, for example, of a settings control of the application 320/322. In other embodiments, the association module 328 may be a component of the platform 320 and appear as an independent application of platform 320. Upon launching the association module 328, the user 102 is presented with a user interface displaying a picture or some other representation of a paired electronic device 104. If paired or locally connected to multiple electronic devices 104, the user 102 may be enabled by the user interface to switch between depictions of the multiple electronic devices 104. In addition to depicting the electronic device 104, the association module 328 enables the user 102 to interact with the depiction or provide input related to the depiction. If the user interface is rendered on a touch sensitive display, the user 102 may interact with the depiction in the same way that the user 102 would interact with the control 106. The association module 328 receives the inputs from the touch sensitive display and matches them to the pattern or duration of user interaction with the control 106 to be stored in association data 326. In other embodiments, the display of the telecommunication device 108 is not touch sensitive. In such embodiments, user interactions with buttons or keys or a touch pad of the telecommunication device 108 are translated to patterns of durations of user interaction with the control 106 and are optionally displayed on the user interface of the telecommunication device 108 by showing the depiction of the control 106 moving in the pattern or for the duration. After entry of a pattern or duration, the association module 328 presents the user 102 with a list of applications or features to select from. After selecting an application or feature, the user 102 is further presented with a list of actions (e.g., "answer call"). Once the user 102 then selects the action, the association module 328 creates or updates association data 326 with the new mapping. In one implementation, the association module 328 further displays lists of electronic device modes 218 or telecommunication device contexts 324 to select from and associate with the action and pattern or duration.

In some embodiments, the association module 328 further enables the user 102 to select a group of actions, application, or feature from a list and, in response to the selection, present the user 102 with a further list of electronic devices 104, thus enabling the user to associate one of the electronic devices 104 with the selected group, application, or feature.

In addition to creating and updating the association data 326, the association module 328 may periodically cause all or a part of the association data 326 to be provided to the electronic device 104 as association data 220. In one implementation, the association module 328 transmits the portion of the association data 326 that is associated with the electronic device 104 but not portion(s) of the association data 326 that are associated with other electronic devices.

In various embodiments, the memory 318 also stores a recognition module 330 that is programmed to be operated by the processor(s) 302 to recognize commands to perform actions included in signals 118 based on the association data 326 and to cause the action to be performed. The recognition module 330 may comprise any number of sub-modules, applications, threads, or processes and may include stored data associated with the recognition module 330.

The recognition module 330 may initially be invoked by the communication module 334 in response to receipt of a message including signal 118 from the electronic device 104. The communication module 334 may provide the signal 118 as well as any indication of a device mode 218 or device identifier 216 include in the message. The recognition module 330 may then determine the telecommunication device context 324 by retrieving that value from memory 318. In some embodiments, the recognition module 330 then compares the signal 118 and optionally one or more of the device identifier 216, the device mode 218, and the telecommunication device context 324 to the association data 326 to determine an action to perform. In one embodiment, the comparison may not result in any action being determined (e.g., because the signal is not present in the association data). In such an embodiment, the telecommunication device 108 communicates with a remote server, such as a server of a service provider, and receives an identification of an action to perform. After determining the action or receiving an indication of the action, the recognition module 330 invokes the platform 320 or application 322 associated with the action (e.g., through an interface of the platform 320 or application 322). The platform 320 or application 322 is instructed to perform the action. The recognition module 330 then awaits an indication of a result from the platform 320 or application 322. Upon receiving the indication, the recognition module 330 invokes the feedback module and provides the indication to the feedback module 332.

In some embodiments, the feedback module 332 may comprise any number of sub-modules, applications, threads, or processes and may include stored data associated with the feedback module 332. Upon invocation by the recognition module 330, the feedback module 332 creates a feedback message 122 in a form capable of being understood by the electronic device 104. The feedback module 332 may then invoke the communication module 334, providing the communication module 334 with the feedback message 122 for transmission to the electronic device 104. In some embodiments, the feedback module 332 may also cause a message to be displayed via a user interface 120 of the telecommunication device 108, as shown in FIG. 1, indicating success or failure of the action.

In various embodiments, the communication module 334 may comprise any number of sub-modules, applications, threads, or processes and may include stored data associated with the communication module 334. The communication module 334 is configured to send and receive messages via the local connection between the electronic device 104 and telecommunication device 108. The communication module 334 may communicate with the interfaces 304 or transceivers 308 to send and receive messages via the interfaces 304 or transceivers 308. As shown in FIG. 1, these messages may include signals 118 and feedback 122. In some embodiments, in addition to sending and receiving messages, the communication module 334 may participate in pairing the telecommunication device 108 to the electronic device 104 or in establishing the local connection. Also, as mentioned above, the communication module 334 may invoke the recognition module 330 or be invoked by the feedback module 332 and may be passed a feedback message to transmit to the electronic device 104.

Example Operations

Figure 4:
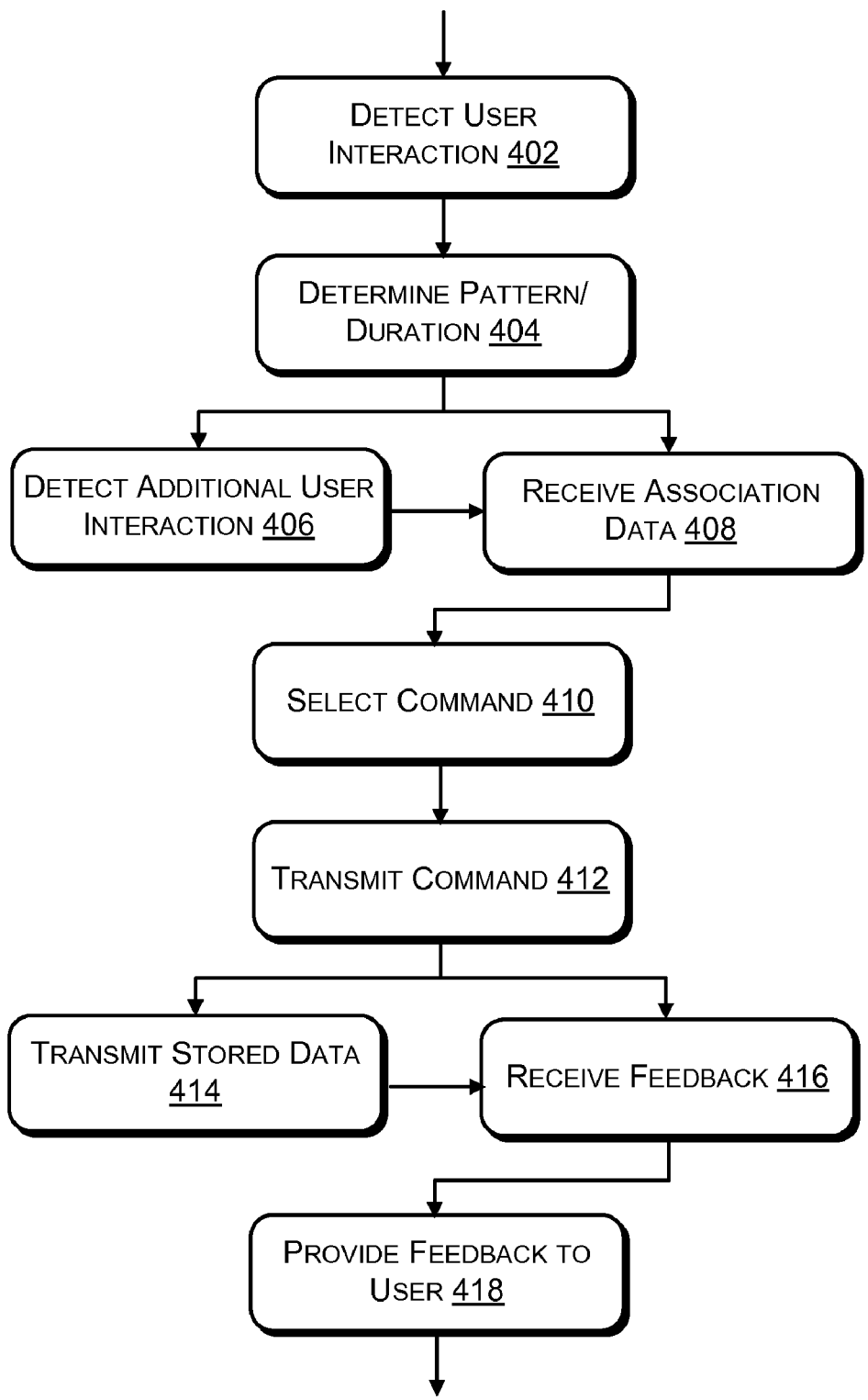
FIG. 4 is a flowchart showing a method of detecting user interaction with the multidirectional control of the electronic device and of selecting a command to transmit to the telecommunication device based on the user interaction, in accordance with various embodiments.

FIG. 4 illustrates a method of detecting user interaction with the multidirectional control of the electronic device and of selecting a command to transmit to the telecommunication device based on the user interaction, in accordance with various embodiments. As illustrated at block 402, an electronic device 104 detects user interaction with the multidirectional control 106 of the electronic device 104. At block 404, the electronic device then determines at least one of a pattern or duration of the user interactions. The pattern of user interactions may include at least one of a linear movement, an amount of linear movement, a sequence of linear movements, a circular movement, an amount of circular movement, a sequence of circular movements, or any sequence of movements of the multidirectional control 106 in any order.

At block 406, the electronic device 104 detects an additional user interaction with the electronic device 104 and determines a mode 218 of the electronic device 104 based on the additional user interaction, the electronic device 104 having a plurality of modes. In some implementations, the mode 218 is associated with a group of commands or a telecommunication device application or feature.

At block 408, the electronic device 104 then receives association data 218 from the telecommunication device 108. While shown as occurring after block 404 or 406, the receiving of block 408 may occur at any time.

At block 410, the electronic device 104 selects a command to transmit to the telecommunication device 108, the selecting being based at least on the detected pattern or duration and on association data 218 mapping patterns or durations of user interactions to commands. In one implementation, the command is a signal interpreted by the telecommunication device 108 based on one or more of a telecommunication device context 324, an electronic device mode 218, or an electronic device identifier 216. Also, in another implementation, a same pattern or duration of user interaction is associated with multiple commands, each command associated with a combination of a pattern or duration of user interaction and a mode 218.

At block 412, the electronic device 104 transmits the command to the telecommunication device 108 via a local connection between the electronic device 104 and the telecommunication device 108. In one implementation, the transmitting includes transmitting an indication of a selected mode 218 of the electronic device 104 or an identifier 216 of the electronic device 104.

At block 414, the electronic device 104 further transmits data stored on the electronic device 104 to the telecommunication device 108 in response to user interaction with the electronic device 104.

At block 416, the electronic device 104 receives a result of the command from the telecommunication device 108, and, at block 418, the electronic device 104 provides haptic, visual, or auditory feedback to a user 102 of the electronic device 104 to indicate the result of the command.

Figure 5:
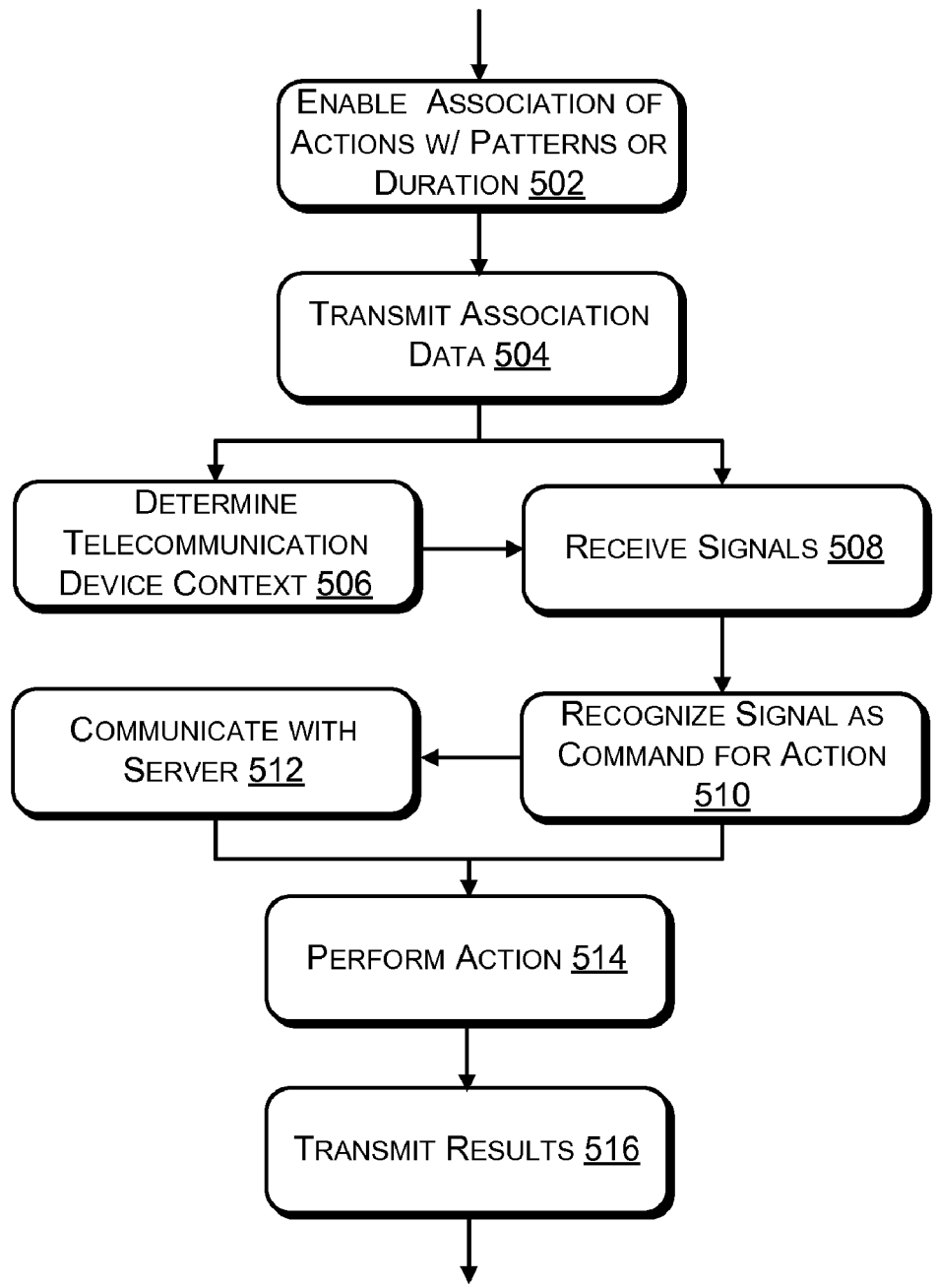
FIG. 5 is a flowchart showing a method of enabling a user to associate a telecommunication device action with user interaction with the multidirectional control of the electronic device, of receiving a command based on that association, and of performing the command, in accordance with various embodiments.

FIG. 5 illustrates a method of enabling a user to associate a telecommunication device action with user interaction with a multidirectional control of an electronic device, of receiving a command based on that association, and of performing the command, in accordance with various embodiments. As illustrated at block 502, a telecommunication device 108 enables a user 102 to associate actions to be performed by the telecommunication device 108 with patterns or durations of user interaction with a control 106 of an electronic device 104 that is separate and distinct from the telecommunication device 108. In one implementation, the enabling includes providing a user interface associated with one of a telecommunication device platform 320 or a telecommunication device application 322. Also, the action may be one of answering a voice call, initiating a voice call with a contact, accepting a calendar appointment, rejecting a calendar appointment, playing telecommunication device content, pausing telecommunication device content, stopping playing of telecommunication device content, fast-forwarding telecommunication device content, or rewinding telecommunication device content.

At block 504, the telecommunication device 108 transmits the association data 218 to the electronic device 104.

At block 506, the telecommunication device 108 determines a context 324 of the telecommunication device 108. While shown preceding the receipt of signals 118 from the electronic device 104, the context determination can occur before, during, or after receipt of signals 118.

At block 508, the telecommunication device 108 receives a signal 118 from the electronic device 104 and, at block 510, recognizes the signal 118 as a command to perform an action, the recognition being based on association data 316 mapping the signal 118 to a pattern or duration of user interaction with the control 106, the pattern or duration being associated with the action. In one implementation, the signal 118 is associated with multiple commands and the command is further recognized based on at least one of a telecommunication device context 324, an electronic device mode 218, or an electronic device identifier 216. In a further implementation, the telecommunication device 108 receives multiple signals 118 from multiple electronic devices 104, each electronic device 104 associated with an application or feature of the telecommunication device 108.

At block 512, if the signal 118 is not recognized, the telecommunication device 108 communicates with a server to identify the signal 118.

At block 514, the telecommunication device 108 performs the action, and, at block 516, the telecommunication device 108 transmits the results as feedback 122 to the electronic device 104.

Example Devices

Figure 6A:
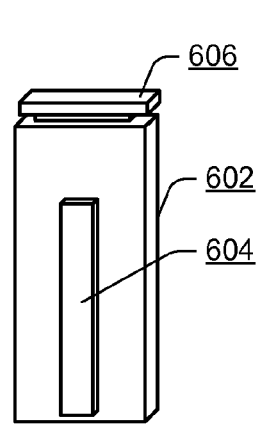
FIGS. 6a-6c are illustrations of example electronic devices with a bi-directional slider control, in accordance with various embodiments.
Figure 6B:
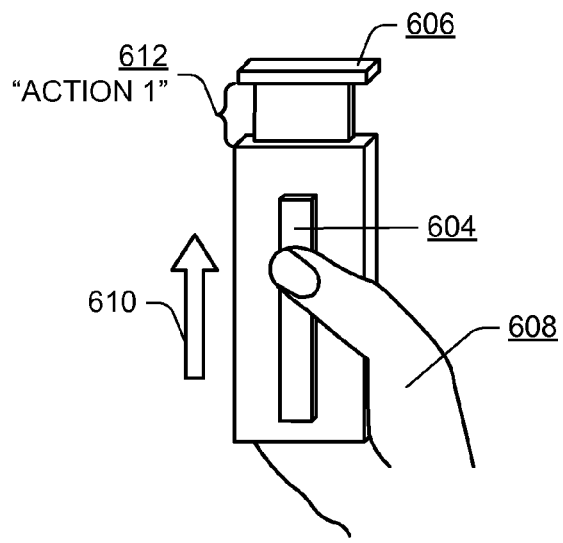
Figure 6C:
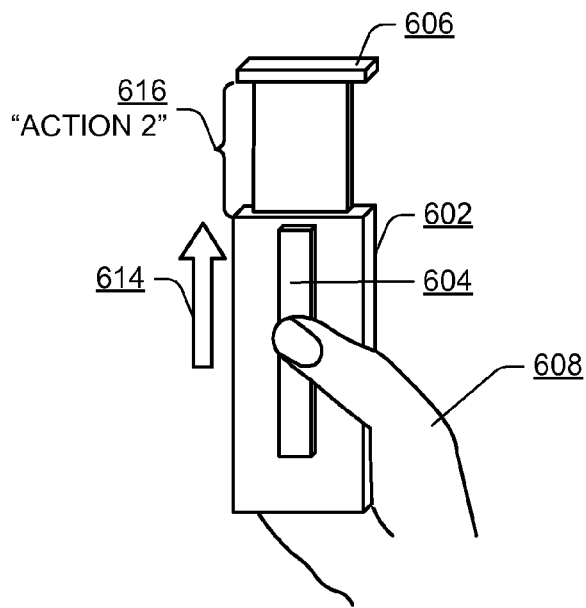

FIGS. 6a-6c are illustrations of example electronic devices with a bi-directional slider control, in accordance with various embodiments. Each of FIGS. 6a-6c illustrates a same electronic device 602 with a bi-directional slider control 604 (hereinafter "control 604"). Movement of the control 604 extends or shortens a component attaching an end cap 606 to the electronic device 602. FIG. 6a shows the electronic device 602 prior to any user interaction and with the component shortened as much as possible, making the end cap 606 appear integral to the electronic device 602. In FIG. 6b, a user 608 interacts with the control 604, moving it in an "up" direction 610 (with what is considered "up" varying from embodiment to embodiment) and extending the component and end cap 606 away from other parts of the electronic device 602. The distance that the component and end cap 606 are extended may be associated with an action 612 ("Action 1") performed on a telecommunication device. FIG. 6c illustrates further user interaction with the control 604 causing additional movement in the "up" direction 614. The new distance that component and end cap 606 are extended may be associated with an action 616 ("Action 2") performed on a telecommunication device.

In various embodiments, the electronic device 602 may be used to answer voice calls in a speaker phone mode. For example, when a telecommunication device rings, the user 608 may move the control 604 "upwards" to answer the call in a speaker phone mode and may move the control 604 even further "upwards" to increase the speaker volume of the telecommunication device. Movement in the "downwards" direction may decrease volume, and further movement "downwards" may terminate the call.

Figures 7A, 7B:
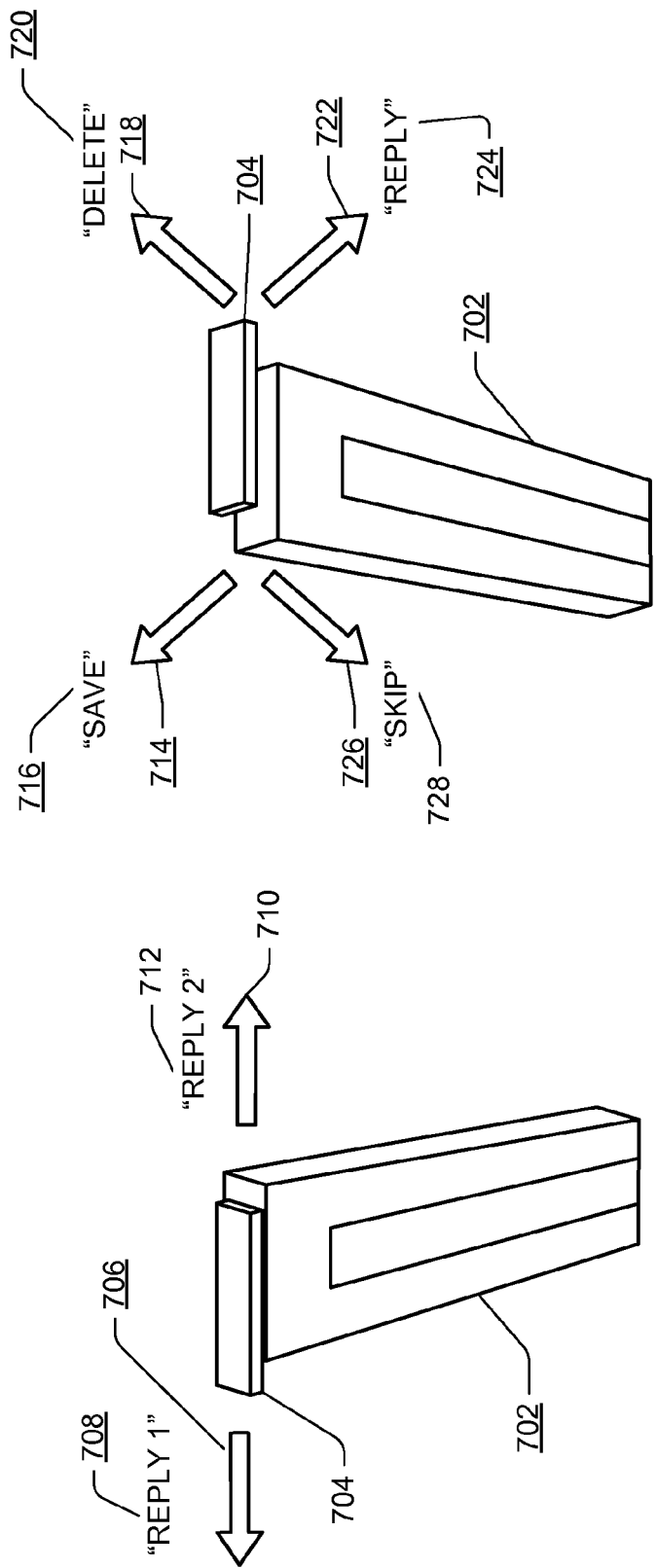
FIGS. 7a-7b are illustrations of example electronic devices with a multidirectional end cap control, in accordance with various embodiments.

FIGS. 7a-7b are illustrations of example electronic devices with a multidirectional end cap control, in accordance with various embodiments. FIGS. 7a-7b illustrates an electronic device 702 with an attached end cap control 704 (hereinafter "control 704") that is capable of being moved in a number of directions. In FIG. 7a, the control 704 is shown as being moved in at least two directions. Movement in a first direction 706 causes a first action 708 ("Reply 1") to be performed by the telecommunication device. Movement in a second direction 710 causes a second action 712 ("Reply 2") to be performed by the telecommunication device. In some embodiments, "Reply 1" and "Reply 2" are automatic responses to received text messages.

FIG. 7b shows the control 704 as being capable of being moved in at least four directions. Movement in a first direction 714 causes a first action 716 ("Save") to be performed by the telecommunication device. Movement in a second direction 718 causes a second action 720 ("Delete") to be performed by the telecommunication device. Movement in a third direction 722 causes a third action 724 ("Reply") to be performed by the telecommunication device. Movement in a fourth direction 726 causes a fourth action 728 ("Skip") to be performed by the telecommunication device. In some embodiments, "Save," "Delete," "Reply," and "Skip" are actions taken with respect to a text message of a number of received text messages that a user is reviewing.

FIGS. 8a-8c are illustrations of example electronic devices with a multidirectional slider control, in accordance with various embodiments. FIGS. 8a-8c illustrate an electronic device 802 with a slider control 804 (hereinafter "control 804") that can be moved in any direction within an ovular bound. Various positions in the ovular bound of the control 804 are associated with various actions. In FIG. 8*a*, a movement of the control 804 to a first location causes a play or pause action 806. Movement of the control 804 to a second location causes a fast-forward action 808. Movement of the control 804 to a third location causes a stop action 810. Movement of the control to a fourth location causes a rewind action 812. The various actions 806-812 may all be performed with respect to a media content item rendered on a telecommunications device, such as a song or video clip.

In FIG. 8*b*, a movement of the control 804 to a first location causes the display 814 of a bus stop ("ride") location on a map on a telecommunication device, the bus stop offering transportation to a ski slope. Movement of the control 804 to a second location causes the display 816 of a ski lift location on a map on the telecommunication device. Movement of the control 804 to a third location causes the display 818 of a lodge location on a map on the telecommunication device.

In FIG. 8*c*, a movement of the control 804 to a first location causes a user to purchase 820 a product currently advertised on the telecommunication device. Movement of the control 804 to a second location causes a user to block 822 display of an advertisement for the product. Movement of the control 804 to a third location causes a user to rate 824 the advertised product. Further movement from the third location causes the user to provide a rating 826 of four stars, a rating 828 of three stars, a rating 830 of two stars, and a rating 832 of one star, each of the ratings 826-832 being associated with a specific movement of the control 804 and a specific location of the control 804 within the ovular bound.

FIGS. 9*a*-9*c* are illustrations of example electronic devices with a multidirectional, attachable pendant control, in accordance with various embodiments. FIGS. 9*a*-9*c* illustrate an electronic device 902 implemented as a necklace pendant. In FIG. 9*a*, the electronic device 902 has a decorative faceplate control 904 that can be moved in at least two directions, each direction associated with a different action. For example, movement 906 could be associated with the answer "yes" to a question displayed on a telecommunication device and movement 908 could be associated with the answer "no."

In FIG. 9*b*, the electronic device 902 is shown as being capable of having its control switched. For example, decorative faceplate control 904 may be removed and a different decorative faceplate control 910 may be attached.

In FIG. 9*c*, the decorative faceplate control 910 is shown as being moveable in at least four directions. These include an "up" direction 912, a "right" direction 914, a "down" direction 916, and a "left" direction 918 (with what is considered "up," "right," "down," and "left" varying from embodiment to embodiment). Each direction may be associated with a specific action or actions performed on the telecommunications device.

FIGS. 10*a*-10*d* are illustrations of example electronic devices with a multidirectional, integrated control and multiple modes, in accordance with various embodiments. In FIG. 10*a*, an electronic device 1002 is shown being shaken by a user 1004 to affect a mode switch. Each shaking interaction may cause a switch to a different mode.

In FIG. 10*b*, the electronic device 1002 is shown in a first mode 1006 associated with initiating calls to family members. The electronic device 1002 has an internal control 1008 (hereinafter "control 1008") that detects movement of a user finger on the electronic device 1002. Movement of the user's finger in a first direction causes initiation 1010 of a voice call to the user's dad. Movement of the user's finger in a second direction causes initiation 1012 of a voice call to one of the user's children. Movement of the user's finger in a third direction causes initiation 1014 of a voice call to all family members. Movement of the user's finger in a fourth direction causes initiation 1016 of a voice call to another of the user's children.

In FIG. 10*c*, the electronic device 1002 is shown in a second mode 1018 associated with management of the user's voice mail queue. Movement of the user's finger in a first direction causes the saving 1020 of a voice mail. Movement of the user's finger in a second direction causes the playing 1022 of a next voice mail. Movement of the user's finger in a third direction causes the deletion 1024 of a currently played voice mail. Movement of the user's finger in a fourth direction causes the playing 1026 of a previous voice mail.

In FIG. 10*d*, the electronic device 1002 is shown in a third mode 1028 associated with managing a queue of received meeting invitations. Movement of the user's finger in a first direction causes the acceptance 1030 of a meeting invitation. Movement of the user's finger in a second direction causes the viewing 1032 of a next meeting invitation. Movement of the user's finger in a third direction causes the declining 1034 of a meeting invitation. Movement of the user's finger in a fourth direction causes the viewing 1036 of a previous meeting invitation.

FIG. 11 is an exploded view of an electronic device housing and internal components, in accordance with various embodiments. In FIG. 11, an electronic device is shown as including a first housing component 1102, a spring plate 1104, a collection of components 1106, and a second housing component 1108. The first and second housing components combine to form housing 202, which is described above in greater detail. Housing 202 encloses the spring plate 1104 and collection of components 1106. Also, the spring plate 1104 includes a mouse pad 1110 and the collection of components 1106 includes a track ball 1112. Together, the mouse pad 1110 and track ball 1112 comprise an internal control 106.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
   detecting, by an electronic device, at least one of a pattern or duration of user interactions with a multidirectional control of the electronic device;
   selecting, by the electronic device, a command to transmit to a telecommunication device based at least on the detected pattern or duration and on association data mapping patterns or durations of user interactions to commands; and
   transmitting, by the electronic device, the command to the telecommunication device via a local connection between the electronic device and the telecommunication device.

2. The method of claim 1, wherein the pattern of user interactions includes at least one of a linear movement, an amount of linear movement, a sequence of linear movements, a circular movement, an amount of circular movement, a sequence of circular movements, or any sequence of movements of the multidirectional control in any order.

3. The method of claim 1, further comprising detecting an additional user interaction with the electronic device and determining a mode of the electronic device based on the additional user interaction, the electronic device having a plurality of modes.

4. The method of claim 3, wherein a same pattern or duration of user interaction is associated with multiple commands, each command associated with a combination of a pattern or duration of user interaction and a mode.

5. The method of claim 3, wherein the mode is associated with a group of commands or a telecommunication device application or feature.

6. The method of claim 1, further comprising receiving a result of the command from the telecommunication device and providing haptic, visual, or auditory feedback to a user of the electronic device to indicate the result of the command.

7. The method of claim 1, wherein the transmitting includes transmitting an indication of a selected mode of the electronic device or an identifier of the electronic device.

8. The method of claim 1, further comprising transmitting data stored on the electronic device to the telecommunication device in response to user interaction with the electronic device.

9. The method of claim 1, wherein the command is a signal interpreted by the telecommunication device based on one or more of a telecommunication device context, an electronic device mode, or an electronic device identifier.

10. An electronic device comprising:
 a housing;
 a physical control coupled to the housing that is moveable with respect to the housing in a plurality of directions;
 a processing unit contained by the housing; and
 a plurality of executable instructions configured to be operated by the processing unit to perform operations including:
  detecting user interaction with the physical control;
  selecting a command to transmit to a telecommunication device based on the user interaction and on a selected mode of the electronic device, the electronic device having a plurality of modes each associated with a plurality of commands; and
  transmitting the selected command to the telecommunication device via a personal area network connection between the electronic device and the telecommunication device.

11. The electronic device of claim 10, wherein the electronic device is one of a watch, a key fob, a necklace pendant, a head set, glasses, a brooch, or a belt buckle.

12. The electronic device of claim 10, wherein the control is one of a watch face, a pendant stone, or a decorative attachment.

13. The electronic device of claim 10, wherein the electronic device is specific to an application of the telecommunication device.

14. A method comprising:
 enabling, by a telecommunication device, a user to associate actions to be performed by the telecommunication device with patterns or durations of user interaction with a control of an electronic device that is separate and distinct from the telecommunication device;
 receiving, by the telecommunication device, a signal from the electronic device that is recognized as a command to perform an action, the recognition being based on association data mapping the signal to a pattern or duration of user interaction with the control, the pattern or duration being associated with the action; and
 performing, by the telecommunication device, the action.

15. The method of claim 14, wherein the action is one of answering a voice call, initiating a voice call with a contact, accepting a calendar appointment, rejecting a calendar appointment, playing telecommunication device content, pausing telecommunication device content, stopping playing of telecommunication device content, fast-forwarding telecommunication device content, or rewinding telecommunication device content.

16. The method of claim 14, further comprising transmitting the association data to the electronic device.

17. The method of claim 14, wherein the signal is associated with multiple commands and the command is further recognized based on at least one of a telecommunication device context, an electronic device mode, or an electronic device identifier.

18. The method of claim 14, further comprising receiving multiple signals from multiple electronic devices, each electronic device associated with an application or feature of the telecommunication device.

19. The method of claim 14, wherein the enabling includes providing a user interface associated with one of a telecommunication device platform or a telecommunication device application.

20. The method of claim 14, further comprising communicating with a server to identify an unknown signal received from the electronic device.

* * * * *